Figure 5:
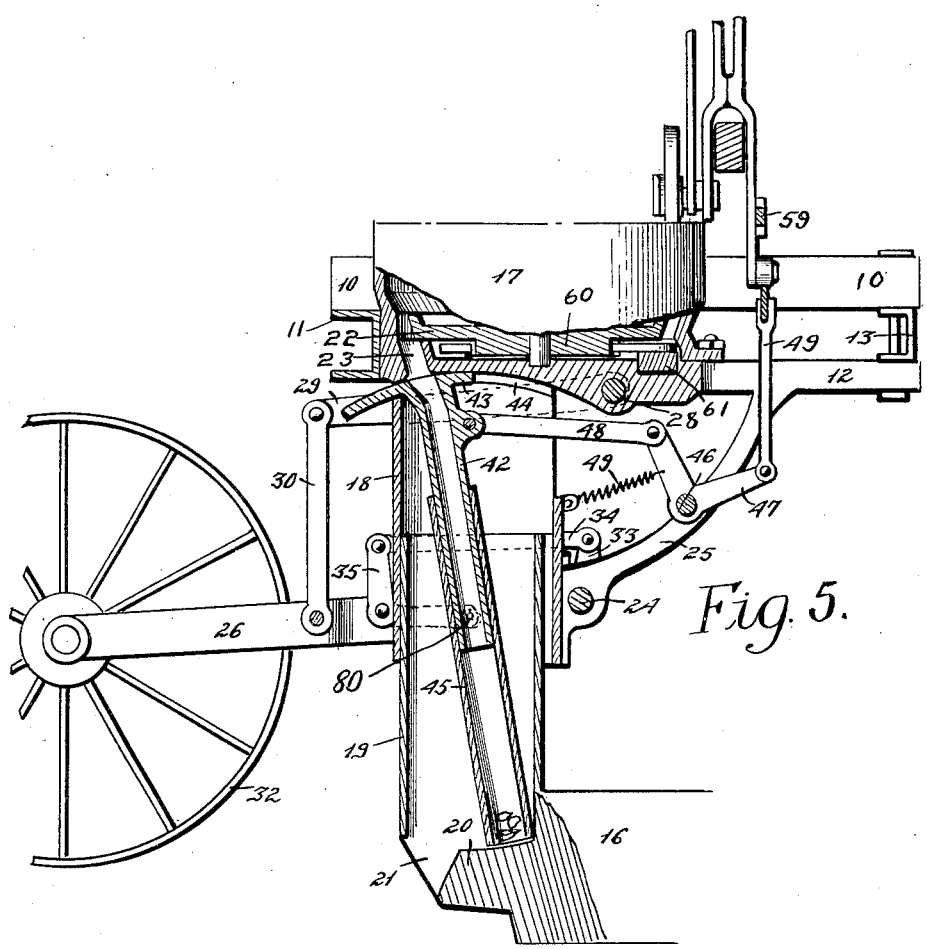

H. SCHLICHT.
CORN PLANTER.
APPLICATION FILED APR. 15, 1912.
1,089,590.
Patented Mar. 10, 1914.
3 SHEETS—SHEET 1.
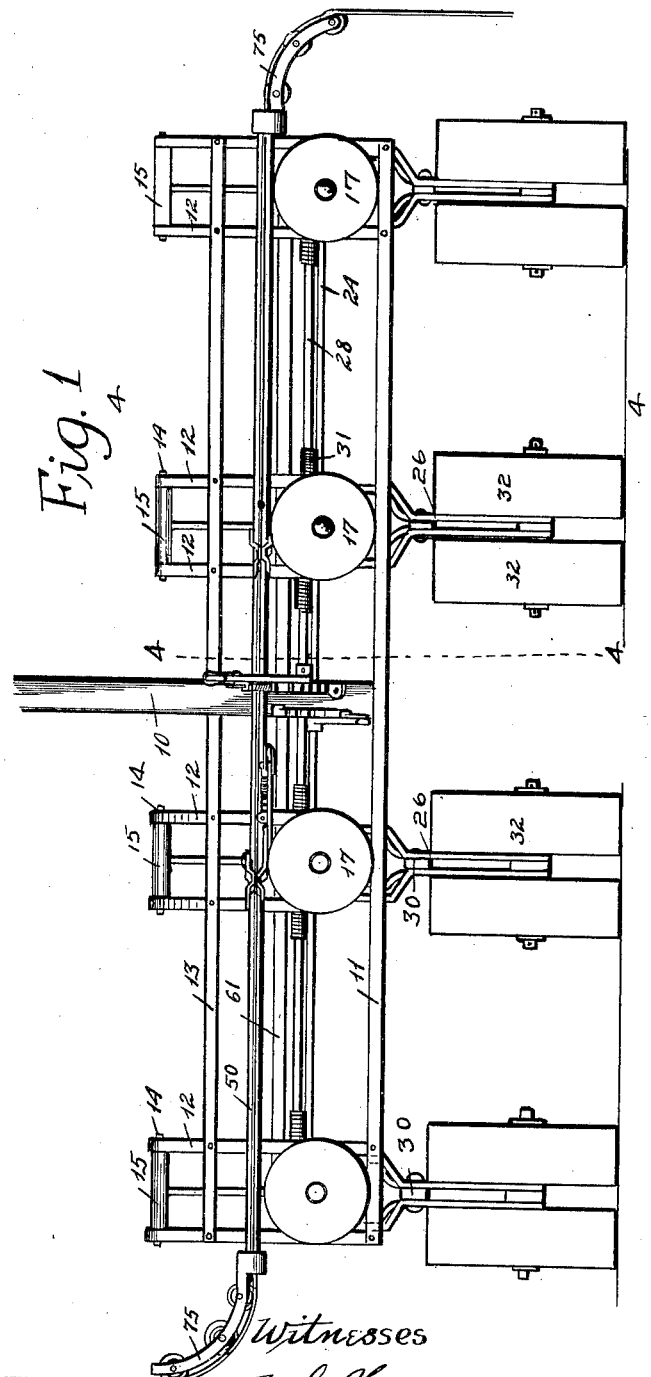

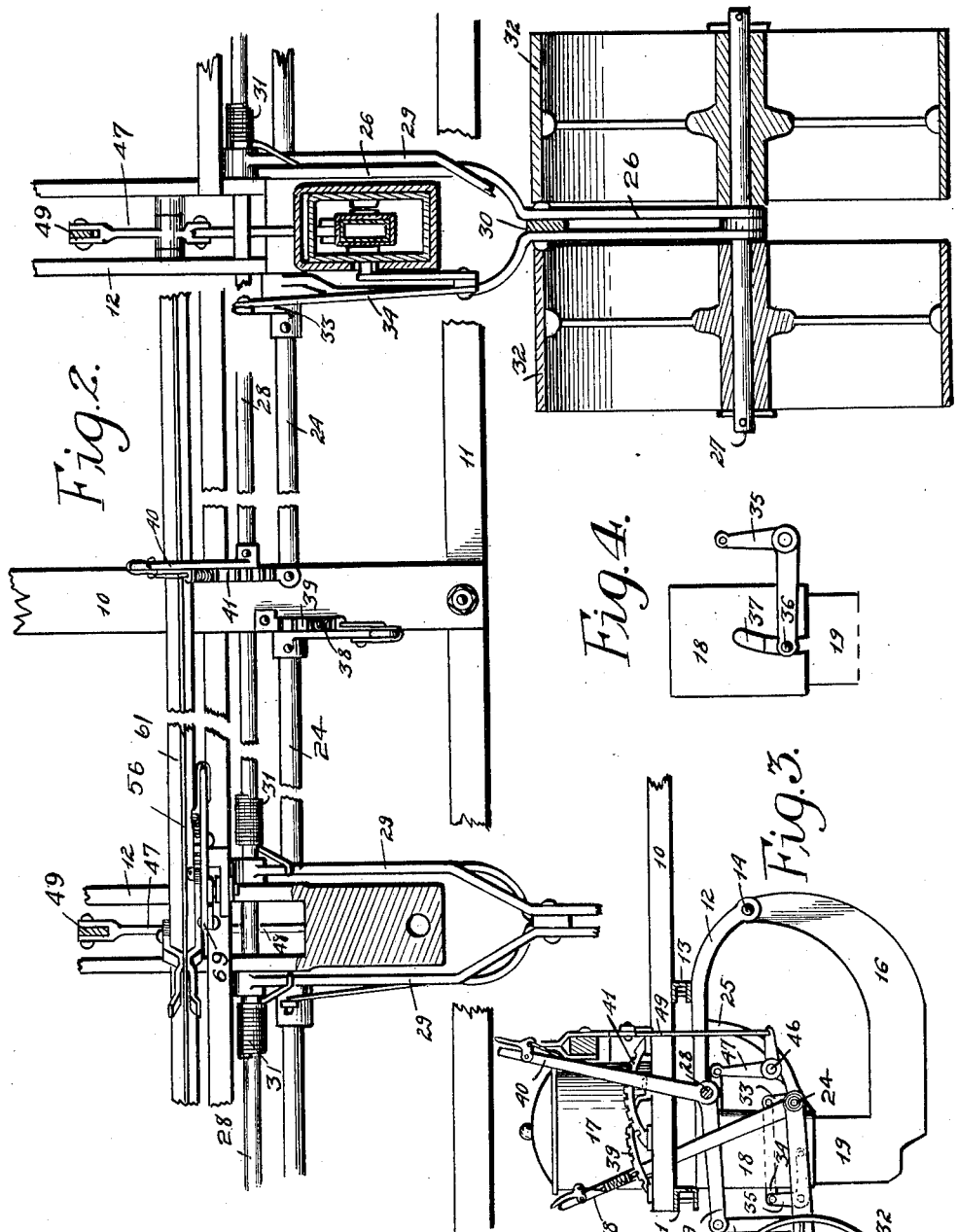

H. SCHLICHT.
CORN PLANTER.
APPLICATION FILED APR. 15, 1912.

1,089,590.

Patented Mar. 10, 1914.

3 SHEETS—SHEET 3.

Witnesses
A. G. Hague
W. A. Loftus.

Inventor
Hans Schlicht
by Irwin & Bair Attys

UNITED STATES PATENT OFFICE.

HANS SCHLICHT, OF WALNUT, IOWA.

CORN-PLANTER.

1,089,590.      Specification of Letters Patent.      Patented Mar. 10, 1914.

Application filed April 15, 1912. Serial No. 690,894.

*To all whom it may concern:*

Be it known that I, HANS SCHLICHT, a citizen of the United States, residing at Walnut, in the county of Pottawattamie and State of Iowa, have invented a new and useful Corn-Planter, of which the following is a specification.

The object of my invention is to provide a corn planter adapted for planting four rows of corn at once.

A further object is to provide a four row corn planter in which the shoes are capable of pivotal movement in a vertical plane, so that they may always be in the ground, regardless of any inequalities in the surface thereof.

A further object is to provide such a corn planter with double wheels arranged to travel behind each shoe for smoothing and leveling the ground on each side of the row planted; and also for covering the seed.

A further object is to provide such a corn planter with means whereby the relative weight imposed upon the shoes, may be varied as desired, thereby varying the depth of the travel of the shoes in the ground.

A further object is to provide a four horse corn planter, with means whereby the wire is taken up on one side of the planter and let down on the other side without dragging it across the ground.

My invention consists in certain details, in the construction, arrangement and combination of the various parts, whereby the objects contemplated are attained, as hereinafter more fully set forth, pointed out in my claims, and illustrated in the accompanying drawings, in which—

Figure 1 shows a top or plan view of a corn planter embodying my invention. Fig. 2 shows an enlarged, detail, plan view partly in section, of a part of my corn planter. Fig. 3 shows a vertical, sectional view through my corn planter, on the line 4—4 of Fig. 1. Fig. 4 shows a detail view of one of the bell crank levers for moving the shoes. Fig. 5 shows a vertical, sectional, view through one of the seed boxes and shoes.

In the accompanying drawing, I have used the reference numeral 10 to indicate the tongue of the corn planter, the rear end of which is mounted on the transverse horizontal bar 11 of the frame. Extending forwardly from the bar 11 at suitable points for supporting the seed boxes, are pairs of parallel bars 12, the bars of each pair being spaced apart, as clearly shown in Figs. 1 and 2. A transverse, horizontal bar 13, connects the bars near their forward ends. Between the forward ends of each pair of bars 12, is a short shaft 14. On each of the shafts 14, between the pair of bars 12, is rotatably mounted a sleeve 15. Secured to each sleeve 15 is the forward portion of a shoe 16. It is thus seen that the shoes 16 are pivotally mounted at their forward ends. Mounted upon each of the pairs of bars 12, is a seed box 17. Below each seed box 17, is a tube 18. The rear part of each shoe is formed of an upwardly extending tube 19, of smaller diameter than the tube 18. The upper ends of the tubes 19, are telescopically received within the lower ends of the tubes 18, and are small enough to allow some play between the tubes 18 and 19, as shown in Fig. 5.

From the above description, it will be seen that the shoes 16 are capable of pivotal movement in a vertical plane so that the bottom of each shoe may rest upon the ground, regardless of inequalities therein. In the lower rearward part of each tube 19, is an opening 21.

The seed boxes 17 are of ordinary construction. Each of the boxes 17 has in its bottom, an edge drop plate 22, having compartments, each designed to receive one grain. Below the plate 22 at the rear of the box, the bottom of the box is provided with an opening 23 through which the seed is discharged.

A transverse shaft 24 is rotatably mounted in arms 25 of the frame, and extends across the machine. The arms 25 are secured to the bars 12. Secured to the shaft 24 on each side of and in front of each tube 18, is a pair of arms 26, which extends rearwardly past said tubes 18, the arms of each pair being inclined toward each other in the rear of the tube 18, and then extending rearwardly parallel to each other. Centrally mounted in the rear ends of the arms 26, are short horizontal transverse shafts 27, on each end of which are mounted broad wheels 32. The wheels 32 are designed to crush clods and the like on each side of the row being planted, and they also serve to cover the seed dropped through the openings 21.

A transverse horizontal shaft 28 extends across the machine and is rotatably mounted in the frame thereof. The shaft 28 is preferably mounted approximately above the shaft 24. Secured to the shaft 28, on each side and in front of each tube 18, are parallel, horizontal arms 29, which extend rearwardly past the tubes 18 and are then inclined toward each other. Pivoted to the rear ends of the arms 29, is a downwardly extending link 30, which is pivoted to the arms 26, as shown in Fig. 5. On the shaft 28, adjacent to each of the arms 29, is a coil spring 31, secured at one end to said shaft 28. The other end of each coil spring 31, rests on top of and engages the adjacent arm 29, as shown in Fig. 2, and exercises a yielding pressure on same. It will therefore be seen that the frame of the machine is supported on the wheels 32 and upon the necks of the horses, or whatever holds up the front end of the tongue, and that the springs 31 support the weight of the machine. For rotating the shaft 28, and thereby varying the height of the frame, relative to the height of the wheels 32, I provide an upwardly extending lever 40 on the shaft 28. Fixed on the frame adjacent to the lever 40, is a sector 41. The lever 40 and sector 41 coact by means of ordinary mechanism.

For regulating the height of the shoes 16, with relation to the wheels 32, I provide the following means: Pivoted to the shaft 24, near each of the tubes 18, is an upwardly extending arm 33. Pivoted to each arm 33, is a rearwardly extending link 34. Pivoted at one end to the rear end of the link 34, is a bell crank lever 35, which is centrally pivoted on one of the arms 26. One of the arms of the bell crank lever 35 extends forwardly and is pivoted to the side of the tube 19 by means of the bolt 36. The bolt 36, is located at a point above the lower end of the tube 18 and travels in a slot 37 in the tube 18. Fixed to the shaft 24, at a convenient point, is a hand lever 38, adjacent to which on the frame of the machine, is a sector 39. The lever 38 coacts with the sector 39 by means of ordinary mechanism. It will be seen that when the shaft 24 is rotated by means of the lever 38, the tube 19 will be raised or lowered with relation to the wheels 32, thereby making it possible to adjust the depth of the shoes 16 in the ground.

In the tube 18, is a small tube 42, having at its upper end, laterally extending curved flanges 43, which are slidably mounted in curved slots 44 in the sides of the tube 18. The lower end of the tube 42 is telescopically received in the upper end of a tube 45, which is pivoted to the side of the tube 19, near the upper end thereof. It will thus be seen that when the tube 19 is raised or lowered, with reference to the tube 18, the tube 45 will be raised or lowered with reference to the tube 42. The flanges 43, the walls 44, and the bottom 20, hereinbefore described, are curved on the arcs of circles centering at the point where the tube 45 is pivoted to the tube 19. Enough play is permitted at the lower end of the tube 45, with reference to the bottom 20, to permit the tubes 42 and 45 to swing on the bolts 80 as shown by dotted lines in Fig. 5 or other means by which the tube 45 is pivoted to the tube 19. In one position of its movement, the upper end of the tube 42 registers with the lower end of the opening 23. As the seed plate 22 is revolved by ordinary mechanism not herein described, grains of corn are dropped into the opening 23.

For moving the tube 42 backward and forward, and thus moving the flange 43 to position for closing the opening 23, and again moving the tube 42 to position where grains of corn in said opening 23 again drop to the bottom of the tube 45, I provide the following mechanism: Extending transversely through the machine, and rotatably mounted in the frame thereof, is a horizontal shaft 46. Fixed on the shaft 46, near each of the tubes 18, is a bell crank lever 47. One end of each bell crank lever 47 is pivoted to a link 48. Each link 48 is also pivoted to one of the tubes 42 near the upper end thereof, the link 48 being extended in a convenient opening through the tube 18. Extending upwardly from the other end of each bell crank lever 47 is a link 49. For normally holding the bell crank levers 47, the links 48, and the tubes 42, in position where the openings 23 are closed, I secure to each of the tubes 18, an extensible coil spring 49, the other end of which is secured to the adjacent end of the bell crank lever 47 and yieldingly tends to hold the same at the farthest position of its movement away from the tube 18.

For operating the bell crank lever 47, and thereby moving the tube 42 to and from the position where its upper end registers with the opening 23, I provide suitable mechanism not herein further described.

The plates 22 in the side boxes 17 are actuated from an actuating bar 61 by suitable mechanism not herein particularly described.

On each side of the frame of the machine, are arms 75 of ordinary construction for carrying and holding the wire 56.

In the practical operation of my improved corn planter, the machine is drawn forward by any suitable motive power. The frame is supported on the wheels 32 and upon whatever holds up the tongue, the weight falling on the shaft 28, the arms 29, and the springs 31. The wire 56 is laid in the proper position and is then mounted on the arms 75. Assuming that the boxes 17 have been properly filled, the machine may be drawn forward and corn planted. If it is desired to cause the shoes 16 to cut deep, the lever 38 is moved forwardly and through the lever arm 33, the link 34, the bell crank lever 35, and the arms 26, the wheels 32 are raised with relation to the shoes 16, which then carry a considerable portion of the weight of the machine. In this way, the depth of travel of the shoes 16, and the depth at which the seed is planted, may be regulated at the desire of the operator. The height of the frame with relation to the wheels 32, may be varied by means of the lever 40, and the arms 29 and 30. The wheels 32 crush the large clods on each side of the hill of corn and also tend to force some of the dirt into the small trench formed by the shoes 16, thereby covering the seed.

It will be seen that a large number of variations in the details of my machine may be made without departing from its essential features.

The advantages of my improved corn planter have been set forth in the foregoing description. The depth of the trench made by the shoes 16 may be varied as desired. The wheels 32 crush large clods and level the ground on each side of the corn row and leave the ground in good condition for cultivation. The wheels also cover the seed. The number of seeds dropped into each hill is easily regulated. On account of the way in which the wheels 32 and the shoes 16 are mounted on the frame, each wheel and each shoe always travel on the ground, regardless of any inequalities therein.

With my machine, corn can be planted twice as fast as with an ordinary two row planter. The wire is taken up on one side of the machine and laid down on the other side and is therefore not dragged as in the case of a side drop planter.

I claim as my invention:

1. In a device of the class described, a frame, a plurality of seed boxes mounted thereon, a tube below each box, a shoe pivoted to the frame below and in front of each box, an upwardly extending tube on the rear end of each shoe, telescopically connected with one of said first tubes, wheels mounted on the frame behind each box, and means for varying the relative height of each shoe with relation to the adjacent wheel.

2. In a device of the class described, a frame, a plurality of seed boxes mounted thereon, a tube below each box, a shoe pivoted to the frame below and in front of each box, an upwardly extending tube on the rear end of each shoe, telescopically connected with one of said first tubes, wheels mounted on the frame behind each box, and means for raising or lowering the frame with relation to the wheels.

3. In a device of the class described, a frame, a plurality of seed boxes mounted thereon, a tube below each box, a shoe pivoted to the frame below and in front of each box, an upwardly extending tube on the rear end of each shoe, telescopically connected with one of said first tubes, a transverse, horizontal shaft, rearwardly extending arms fixed thereto, adjacent to each of said first tubes, wheels rotatably mounted on the rear ends of said arms, a lever on said shaft, means for varying the relative height of each shoe with relation to the adjacent wheel, said means comprising, in the case of each shoe, a lever arm fixed on said shaft, a horizontal link pivoted thereto, a bell crank lever fixed on one of said first named arms, having one end pivoted to said link, and the other end pivoted to the tube on said shoe.

4. In a device of the class described, a frame, a plurality of seed boxes mounted thereon, a tube below each box, a shoe pivoted to the frame, below and in front of each box, an upwardly extending tube on the rear end of each shoe, telescopically connected with one of said first tubes, a transverse, horizontal shaft rotatably mounted in said frame, arms extending rearwardly therefrom, adjacent to each of said first tubes, wheels rotatably mounted on the rear ends of said arms, a second horizontal transverse shaft rotatably mounted on said frame, a lever thereon, rearwardly extending arms fixed on said second shaft, and a link pivotally connected with the ends of said last named arms and with the respective first named arms.

5. In a device of the class described, a frame, a dropper box having an opening in the bottom thereof, a tube below same, a shoe pivoted at its forward end to said frame, and having at its rearward end an upwardly extending tube telescopically connected with said first tube, and having in its lower end, a closed portion and an open portion, a small tube in said first tube, provided with a flange slidably mounted at the upper end of said tube, so that one position of the movement of said small tube, it registers with the opening in said dropper box and in another position of its movement, said flange closes the opening in the dropper box, a small tube in the said second tube, pivoted to the side thereof, and telescopically connected with said first small tube.

Des Moines, Iowa, January 20, 1912.

HANS SCHLICHT.

Witnesses:
C. D. BOILER,
H. S. MOSHER.